US010718222B2

(12) United States Patent
King et al.

(10) Patent No.: US 10,718,222 B2
(45) Date of Patent: Jul. 21, 2020

(54) DIFFUSER-DESWIRLER FOR A GAS TURBINE ENGINE

(71) Applicant: General Electric Company, Schenectady, NY (US)

(72) Inventors: Christopher David King, Salem, MA (US); David Vickery Parker, Middleton, MA (US); John Alan Manteiga, North Andover, MA (US); Matthew Brian Surprenant, Stoneham, MA (US); Megan Lynn Williams, Salem, MA (US); Awot Michael Berhe, Lynn, MA (US); Jesse Jacob Ollove, Boston, MA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 576 days.

(21) Appl. No.: 15/469,708

(22) Filed: Mar. 27, 2017

(65) Prior Publication Data

US 2018/0274376 A1    Sep. 27, 2018

(51) Int. Cl.
*F02D 9/02* (2006.01)
*F01D 9/02* (2006.01)
(Continued)

(52) U.S. Cl.
CPC ............ *F01D 9/023* (2013.01); *B22F 3/1055* (2013.01); *B22F 5/009* (2013.01); *B22F 5/10* (2013.01); *B33Y 10/00* (2014.12); *B33Y 80/00* (2014.12); *F01D 9/04* (2013.01); *F01D 9/048* (2013.01); *F04D 29/023* (2013.01); *F04D 29/444* (2013.01); *B22F 2999/00* (2013.01); *F05D 2220/323* (2013.01); *F05D 2230/22* (2013.01); *F05D 2230/30* (2013.01);
(Continued)

(58) Field of Classification Search
CPC .......... F01D 9/04; F01D 9/048; F04D 29/023; F04D 29/444; B33Y 10/00; B33Y 80/00; B22F 3/10; B22F 3/1055; B22F 5/009; B22F 5/10
USPC ..................................................... 415/211.2
See application file for complete search history.

(56) References Cited

U.S. PATENT DOCUMENTS

| 4,027,997 A | 6/1977 | Bryans |
| 4,541,774 A | 9/1985 | Rieck et al. |

(Continued)

FOREIGN PATENT DOCUMENTS

| FR | 2757210 | 6/1998 |
| JP | 2009197614 | 9/2009 |
| KR | 101408140 | 6/2014 |

*Primary Examiner* — John Kwon
*Assistant Examiner* — Johnny H Hoang
(74) *Attorney, Agent, or Firm* — Dinsmore & Shohl LLP

(57) ABSTRACT

A diffuser-deswirler for a gas turbine engine is provided. The diffuser-deswirler includes an inner shell and an outer shell spaced apart and configured for receiving a flow of compressed air from a compressor of a gas turbine engine. A plurality of vanes extend between the inner shell and the outer shell to define a plurality of fluid passageways and a splitter extends along the circumferential direction between adjacent vanes to split the flow of compressed air passing through the each fluid passageway. All of these components are manufactured as a single monolithic piece and are configured for diffusing and deswirling compressor air before passing it to a combustor for an improved combustion process.

14 Claims, 11 Drawing Sheets

(51) Int. Cl.
  *B22F 3/105* (2006.01)
  *F01D 9/04* (2006.01)
  *F04D 29/44* (2006.01)
  *F04D 29/02* (2006.01)
  *B22F 5/10* (2006.01)
  *B33Y 10/00* (2015.01)
  *B33Y 80/00* (2015.01)
  *B22F 5/00* (2006.01)

(52) U.S. Cl.
  CPC .. *F05D 2240/126* (2013.01); *F05D 2240/127* (2013.01); *F05D 2240/129* (2013.01); *F05D 2250/25* (2013.01); *F05D 2250/52* (2013.01); *F05D 2250/70* (2013.01)

(56) References Cited

U.S. PATENT DOCUMENTS

| | | | |
|---|---|---|---|
| 4,966,523 | A | 10/1990 | Sherikar |
| 6,279,322 | B1 | 8/2001 | Moussa |
| 6,589,015 | B1* | 7/2003 | Roberts ............... F01D 9/045 415/208.3 |
| 7,025,566 | B2* | 4/2006 | Sasu ............... F01D 9/045 415/208.3 |
| 7,326,027 | B1* | 2/2008 | Skoch ............... F04D 27/0207 415/150 |
| 7,442,006 | B2 | 10/2008 | Nguyen et al. |
| 7,581,397 | B2 | 9/2009 | Strangman et al. |
| 7,870,739 | B2 | 1/2011 | Bland |
| 8,087,249 | B2 | 1/2012 | Ottaviano et al. |
| 8,133,017 | B2 | 3/2012 | Schott et al. |
| 9,309,809 | B2 | 4/2016 | Johnson et al. |
| 2002/0146320 | A1 | 10/2002 | Moussa et al. |
| 2005/0095127 | A1 | 5/2005 | Sasu et al. |
| 2005/0123394 | A1* | 6/2005 | McArdle ............... F01D 17/165 415/164 |
| 2005/0158173 | A1 | 7/2005 | Nguyen et al. |
| 2005/0196272 | A1* | 9/2005 | Nikpour ............... F04D 29/284 415/206 |
| 2007/0036646 | A1 | 2/2007 | Nguyen et al. |
| 2007/0036647 | A1* | 2/2007 | Abdelwahab ......... F04D 29/444 415/211.2 |
| 2007/0059170 | A1 | 3/2007 | Xu et al. |
| 2007/0183890 | A1 | 8/2007 | Nolcheff et al. |
| 2008/0056892 | A1 | 3/2008 | Barton et al. |
| 2008/0124211 | A1 | 5/2008 | Suciu et al. |
| 2010/0031663 | A1 | 2/2010 | Commaret et al. |
| 2010/0150709 | A1* | 6/2010 | Roduner ............... F01D 9/02 415/204 |
| 2010/0278643 | A1 | 11/2010 | Leblanc et al. |
| 2011/0056207 | A1 | 3/2011 | Commaret et al. |
| 2011/0203282 | A1* | 8/2011 | Charron ............... F01D 9/023 60/722 |
| 2012/0275916 | A1 | 11/2012 | Leblanc |
| 2012/0294703 | A1 | 11/2012 | Lei et al. |
| 2013/0000308 | A1 | 1/2013 | Dovbush et al. |
| 2013/0034425 | A1 | 2/2013 | Biscay et al. |
| 2014/0260289 | A1 | 9/2014 | Graves et al. |
| 2015/0063989 | A1* | 3/2015 | Wang ............... F04D 27/0253 415/157 |
| 2015/0198163 | A1* | 7/2015 | Lei ............... F04D 17/105 415/207 |
| 2015/0226232 | A1* | 8/2015 | Duong ............... F04D 17/10 415/1 |
| 2016/0115971 | A1* | 4/2016 | Duong ............... F04D 29/444 60/751 |
| 2016/0123227 | A1 | 5/2016 | Murray et al. |
| 2016/0281727 | A1* | 9/2016 | Lardy ............... F04D 27/0292 |
| 2017/0114794 | A1* | 4/2017 | Duong ............... F04D 29/441 |
| 2017/0114797 | A1* | 4/2017 | Duong ............... F04D 29/547 |
| 2017/0248155 | A1* | 8/2017 | Parker ............... F04D 29/682 |
| 2017/0362947 | A1* | 12/2017 | Nasir ............... F01D 9/065 |
| 2018/0172022 | A1* | 6/2018 | Duong ............... F04D 29/444 |

* cited by examiner

DIFFUSER-DESWIRLER FOR A GAS TURBINE ENGINE

FIELD

The present subject matter relates generally to diffuser and deswirler assemblies, and more particularly, to additively manufactured diffuser-deswirlers for a gas turbine engine.

BACKGROUND

Typical aircraft propulsion systems include one or more gas turbine engines. For certain propulsion systems, the gas turbine engines generally include a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Compressed air exiting the compressor section of the gas turbine engine typically has a high velocity. For example, the compressor discharge air within certain gas turbine engines may have a Mach number between 0.7 and 0.9. However, a typical combustion section of a gas turbine engine requires a high pressure, low velocity airflow to reduce the likelihood of flame-outs, to facilitate a stable and consistent burn, and to achieve an overall improved combustion process. For example, a combustion section may require a flow of compressed air having a Mach number less than 0.2 or 0.1. Therefore, certain gas turbine engines include diffusers which are designed to recover the static pressure of compressed airflow by decreasing its velocity and deswirlers for straightening the flow of compressed air. However, conventional diffusers and deswirlers are distinct components coupled by a transition duct, resulting in discontinuities, flow perturbations, excess drag, and efficiency losses. In addition, the manufacturing time and costs associated with the assembly of such a multi-part assembly are very high and increase the likelihood of component failures. Furthermore, manufacturing restrictions limit the number, size, and configuration of flow control features formed within such multi-part assemblies.

Accordingly, a gas turbine engine with an improved component for diffusing and deswirling the flow of compressed air into the combustion section would be useful. More specifically, a diffuser and deswirler for a gas turbine engine that is easier to manufacture and includes features for improved static pressure recovery and airflow control for improved combustion would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, a diffuser-deswirler for conditioning a flow of compressed air from a compressor is provided. The diffuser-deswirler defines an axial direction, a radial direction, and a circumferential direction. The diffuser-deswirler includes an annular inner shell and an annular outer shell spaced apart from the inner shell. A plurality of vanes extend between the inner shell and the outer shell, the inner shell, the outer shell, and the plurality of vanes defining a plurality of fluid passageways, at least one of the plurality of vanes defining a leading edge proximate to an impeller of the compressor.

In another exemplary aspect of the present disclosure, a diffuser-deswirler is provided defining an axial direction, a radial direction, and a circumferential direction. The diffuser-deswirler includes an annular inlet manifold and an annular outlet manifold. A plurality of flow conditioning pipes is spaced circumferentially around the inlet manifold and provide fluid communication between the inlet manifold and the outlet manifold. A splitter is defined within each of plurality of flow conditioning pipes to split a flow of compressed air passing through the each of the plurality of flow conditioning pipes.

In still another exemplary aspect of the present disclosure, a method of manufacturing a diffuser-deswirler is provided. The method includes depositing a layer of additive material on a bed of an additive manufacturing machine and directing energy from an energy source onto the layer of additive material to fuse a portion of the additive material and form a diffuser-deswirler. The diffuser-deswirler includes an annular inner shell and an annular outer shell spaced apart from the inner shell. A plurality of vanes extends between the inner shell and the outer shell to define a plurality of fluid passageways. A splitter by extends between adjacent vanes of the plurality of vanes to split a flow of compressed air passing through the each of the plurality of fluid passageways.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
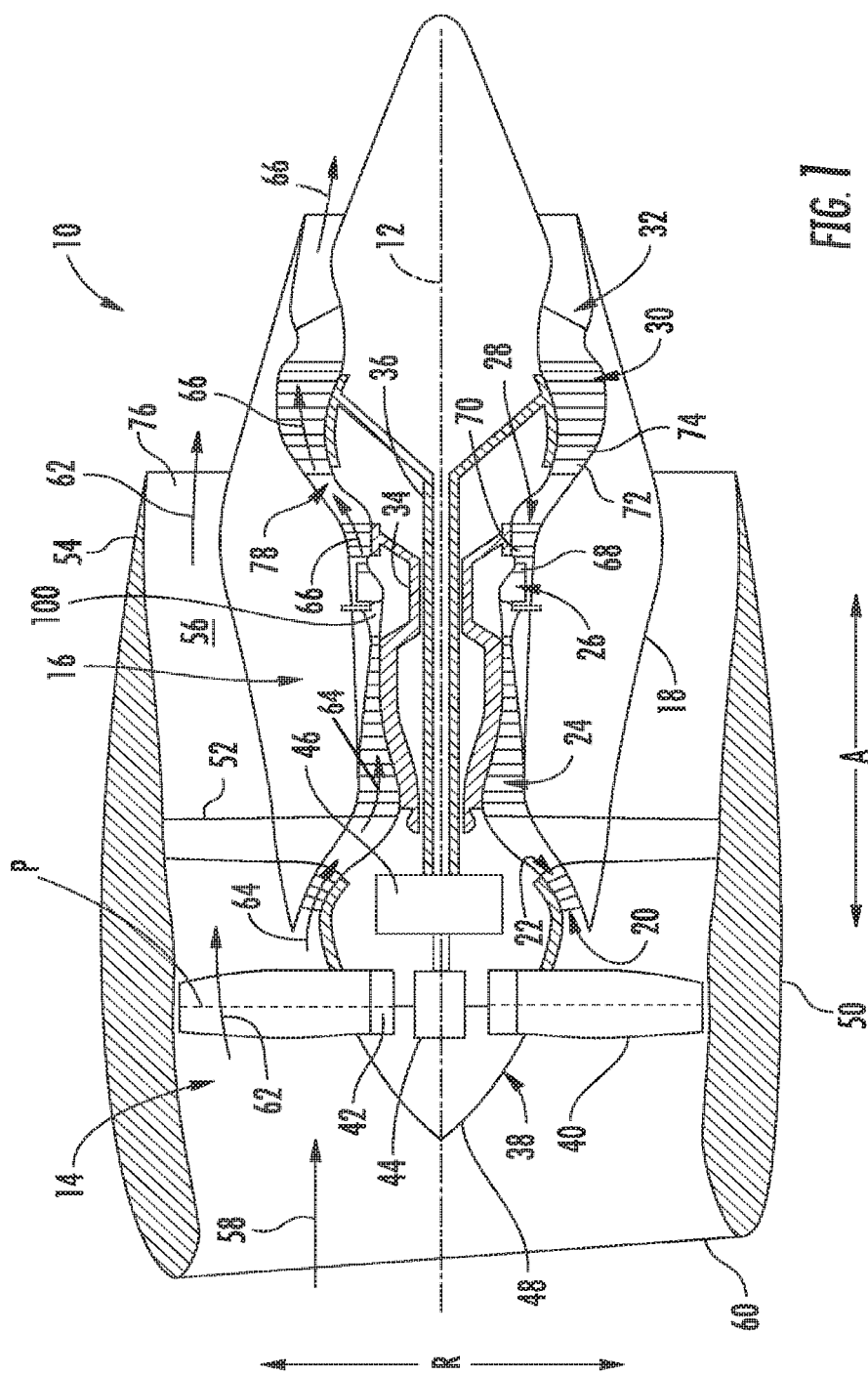
FIG. 1 is a schematic cross-sectional view of an exemplary gas turbine engine according to various embodiments of the present subject matter.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The detailed description uses numerical and letter designations to refer to features in the drawings. Like or similar designations in the drawings and description have been used to refer to like or similar parts of the invention, and identical numerals indicate the same elements throughout the drawings. As used herein, the terms "first", "second", and "third" may be used interchangeably to distinguish one component from another and are not intended to signify location or relative importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The terms "forward" and "aft" refer to relative positions within a gas turbine engine, with forward referring to a position closer to an engine inlet and aft referring to a position closer to an engine nozzle or exhaust.

The present disclosure is generally directed to an additively manufactured diffuser-deswirler for a gas turbine engine. The diffuser-deswirler includes an inner shell and an outer shell that define an annular flow conditioning passageway for receiving a flow of compressed air from a compressor of a gas turbine engine. A plurality of vanes extend between the inner shell and the outer shell to divide the flow conditioning passageway into a plurality of fluid passageways and a splitter extends along the circumferential direction between adjacent vanes to split the flow of compressed air passing through the each fluid passageway. All of these components are additively manufactured as a single monolithic piece and are configured for diffusing and deswirling compressor air before passing it to a combustor for an improved combustion process.

Referring now to the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline or central axis 12 provided for reference), a circumferential direction C (see, e.g., FIG. 4), and a radial direction R extending perpendicular to the axial direction A. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustor or combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed and is attached to one or both of a core frame or a fan frame through one or more coupling systems.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated that the exemplary turbofan 10 depicted in FIG. 1 is by way of example only and that in other exemplary embodiments, turbofan 10 may have any other suitable configuration. For example, it should be appreciated that in other exemplary embodiments, turbofan 10 may instead be configured as any other suitable turbine engine, such as a turboprop engine, turbojet engine, internal combustion engine, etc.

Figure 2:
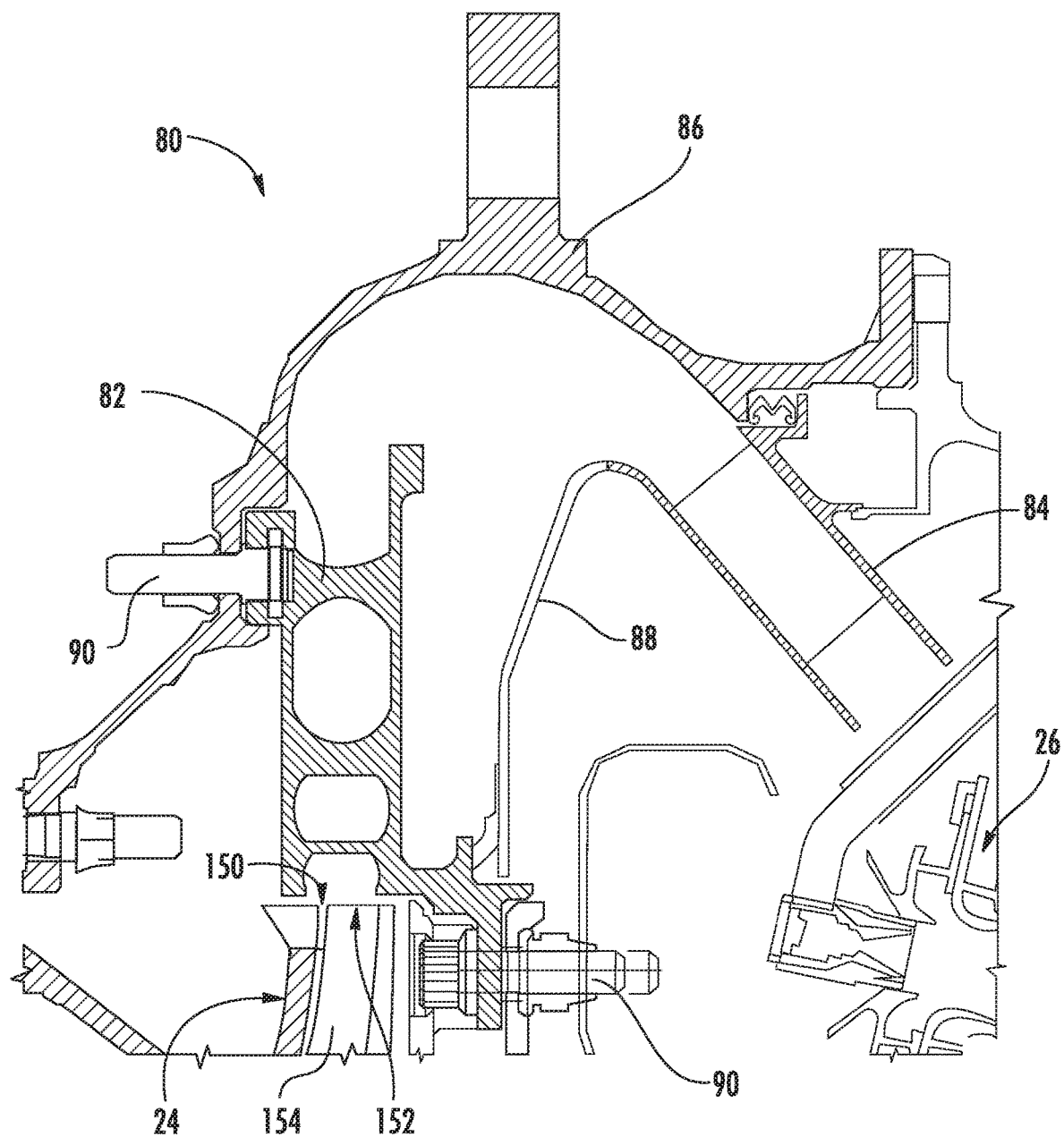
FIG. 2 provides a cross sectional view of a prior art diffuser and deswirler assembly.

Referring now to FIG. 2, a prior art diffuser and deswirler assembly 80 will be described. Diffuser and deswirler assembly 80 generally provides fluid communication between a compressor and a combustor of a gas turbine engine. For example, using turbofan 10 as an example, diffuser and deswirler assembly 80 receives high pressure air from high pressure compressor 24 and passes it to combustion section 26 to facilitate the combustion of fuel and operation of turbofan 10. As explained briefly above, the flow of air exiting high pressure compressor 24 has a high velocity is largely directional, e.g., tangential relative to high pressure compressor 24. Diffuser and deswirler assembly 80 includes a diffuser 82 that is configured for decreasing the velocity and increasing the pressure of the flow of compressed air. In addition, diffuser and deswirler assembly 80 includes a deswirler 84 positioned downstream of diffuser 82. Deswirler 84 is generally configured for deswirling or straightening out the flow of diffused air to achieve improved combustion.

Notably, however, diffuser and deswirler assembly 80 includes diffuser 82 and deswirler 84 as separate components such that the diffusing process and the deswirling process are performed independently of one another. Diffuser 82 and deswirler 84 are joined using an outer frame member 86 and an inner frame member 88. In addition, a plurality of fasteners 90 is used to join these various parts together and secure diffuser and deswirler assembly 80 within turbofan 10. The use of multiple components increases manufacturing costs, necessary component storage, and assembly time. In addition, the various joints and edges resulting from a multi-component construction result in flow perturbations that create drag and result in efficiency losses. It is desirable to reduce or eliminate such losses, simplify manufacturing and assembly, and provide an improved flow of pressurized air into combustion section 26.

Figure 3:
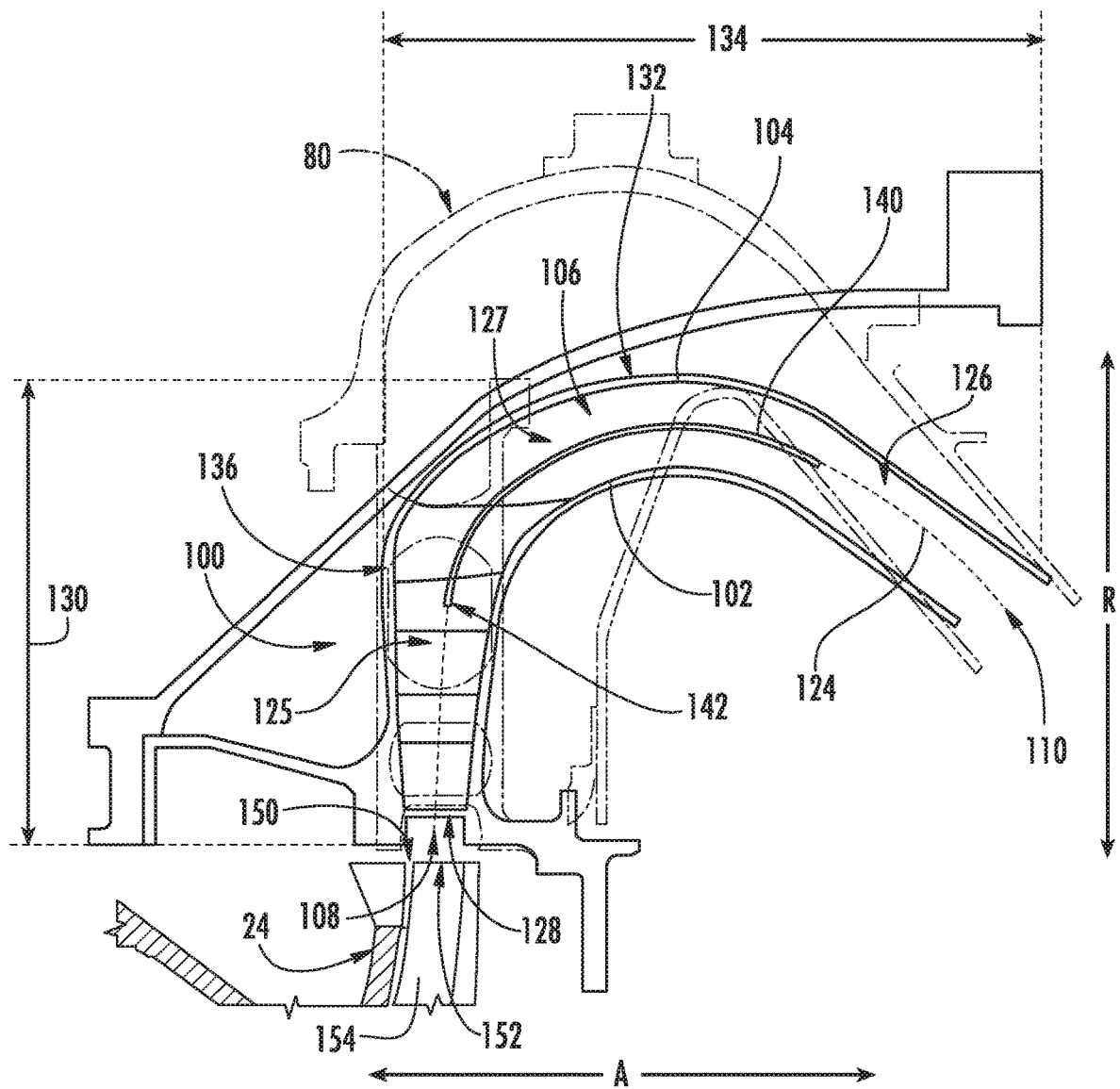
FIG. 3 provides a cross sectional view of an additively manufactured diffuser-deswirler according to an exemplary embodiment of the present subject matter with the prior art diffuser and deswirler assembly of FIG. 2 illustrated in phantom.

Referring now to FIG. 3, a diffuser-deswirler 100 will be described according to an exemplary embodiment of the present subject matter. More specifically, FIG. 3 illustrates diffuser-deswirler 100 overlaid on the prior art diffuser and deswirler assembly 80 from FIG. 2 (illustrated in phantom for comparison). According to an exemplary embodiment, diffuser-deswirler 100 defines an axial direction A, a radial direction R, and a circumferential direction C that correspond to that of turbofan 10 when installed therein. It should be appreciated that diffuser-deswirler 100 is only one exemplary embodiment used for the purpose of illustrating aspects of the present subject matter. Variations and modifications may be made to diffuser-deswirler 100 while remaining within the scope of the present subject matter.

In general, the exemplary embodiments of diffuser-deswirler 100 described herein may be manufactured or formed using any suitable process. However, in accordance with several aspects of the present subject matter, diffuser-deswirler 100 may be formed using an additive-manufacturing process, such as a 3-D printing process. The use of such a process may allow diffuser-deswirler 100 to be formed integrally, as a single monolithic component, or as any suitable number of sub-components. In particular, the manufacturing process may allow diffuser-deswirler 100 to be integrally formed and include a variety of features not possible when using prior manufacturing methods. For example, the additive manufacturing methods described herein enable the manufacture of a single component that can diffuse and deswirl compressed air along an entire length of the component. In addition, diffuser-deswirler 100 may include various features, configurations, thicknesses, materials, densities, and internal fluid passageway features not possible using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt base superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and fluid passageways having unique sizes, shapes, and orientations. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved static pressure recovery, reduced drag, and improved discharge of compressed air for optimal combustion.

Figure 4:
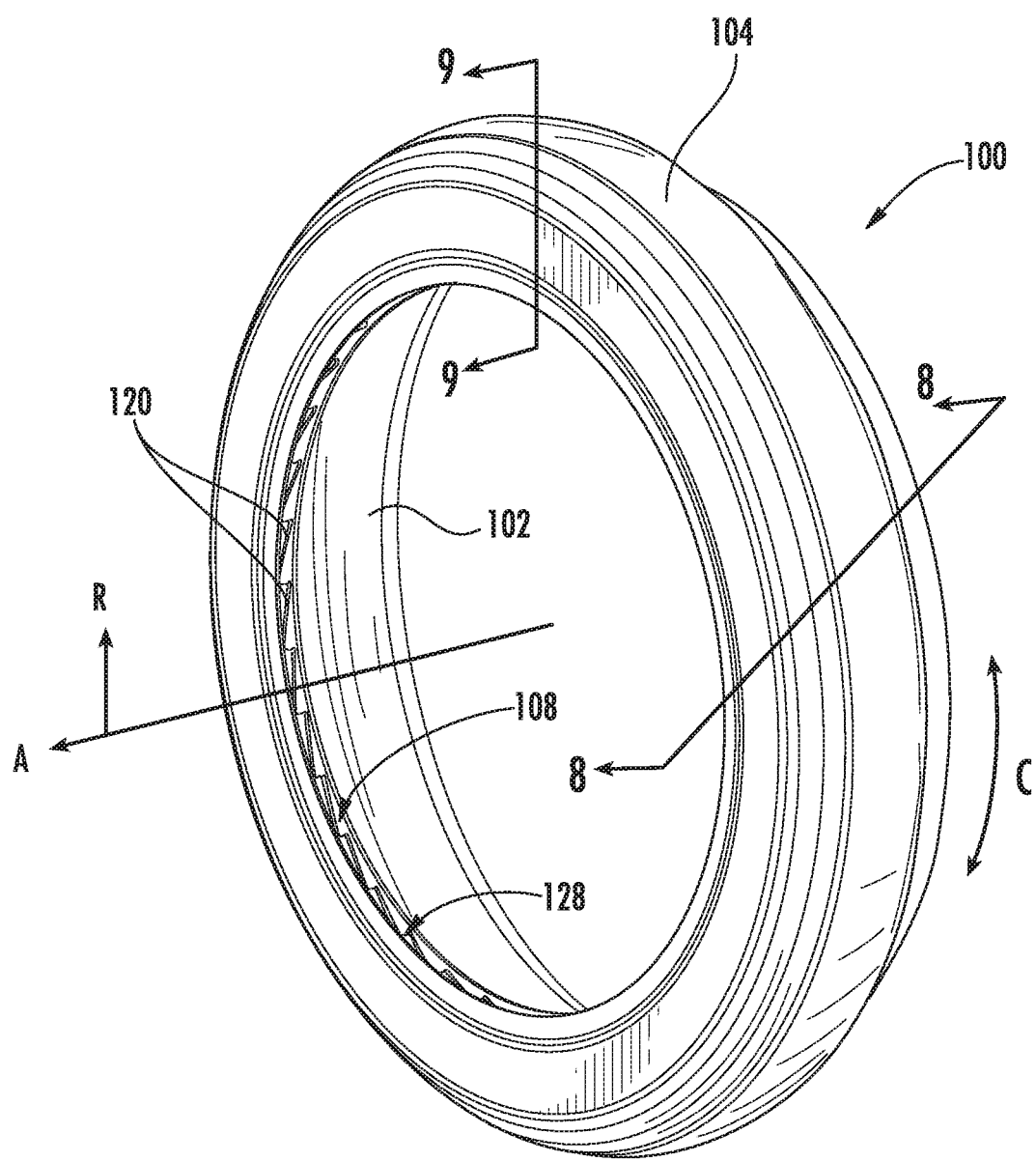
FIG. 4 provides a perspective view of the exemplary diffuser-deswirler of FIG. 3.

Referring generally to FIGS. 3 and 4, diffuser-deswirler 100 will be described. As illustrated, diffuser-deswirler 100 generally includes an annular inner shell 102 and an annular outer shell 104. Inner shell 102 and outer shell 104 extend along the circumferential direction C and are spaced apart to define a flow conditioning passageway 106. Flow conditioning passageway 106 defines an annular inlet 108 for receiving compressed air and an annular outlet 110 for discharging compressed air. For example, using turbofan 10 as an example, inner shell 102 and outer shell 104 are centered along central axis 12 of turbofan 10 such that inlet 108 is in fluid communication with high pressure compressor 24 and outlet 110 is in fluid communication with combustion section 26. As described in more detail below, diffuser-deswirler 100 includes various integral features for conditioning the flow of pressurized air to achieve improved fuel combustion in combustion section 26.

Figure 5:
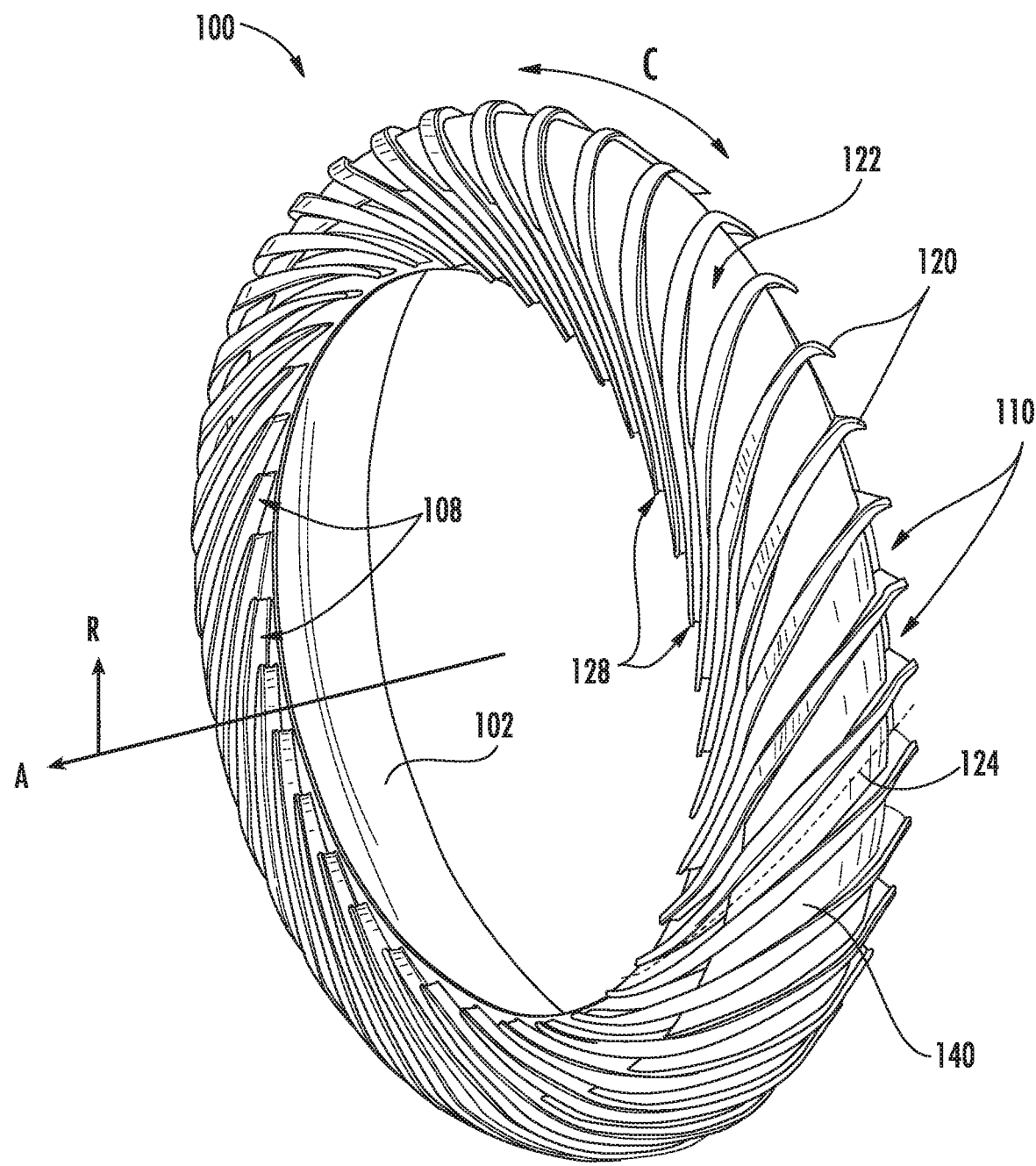
FIG. 5 provides a front perspective view of the exemplary diffuser-deswirler of FIG. 3 with an outer shell removed to reveal a plurality of vanes according to an exemplary embodiment of the present subject matter.
Figure 6:
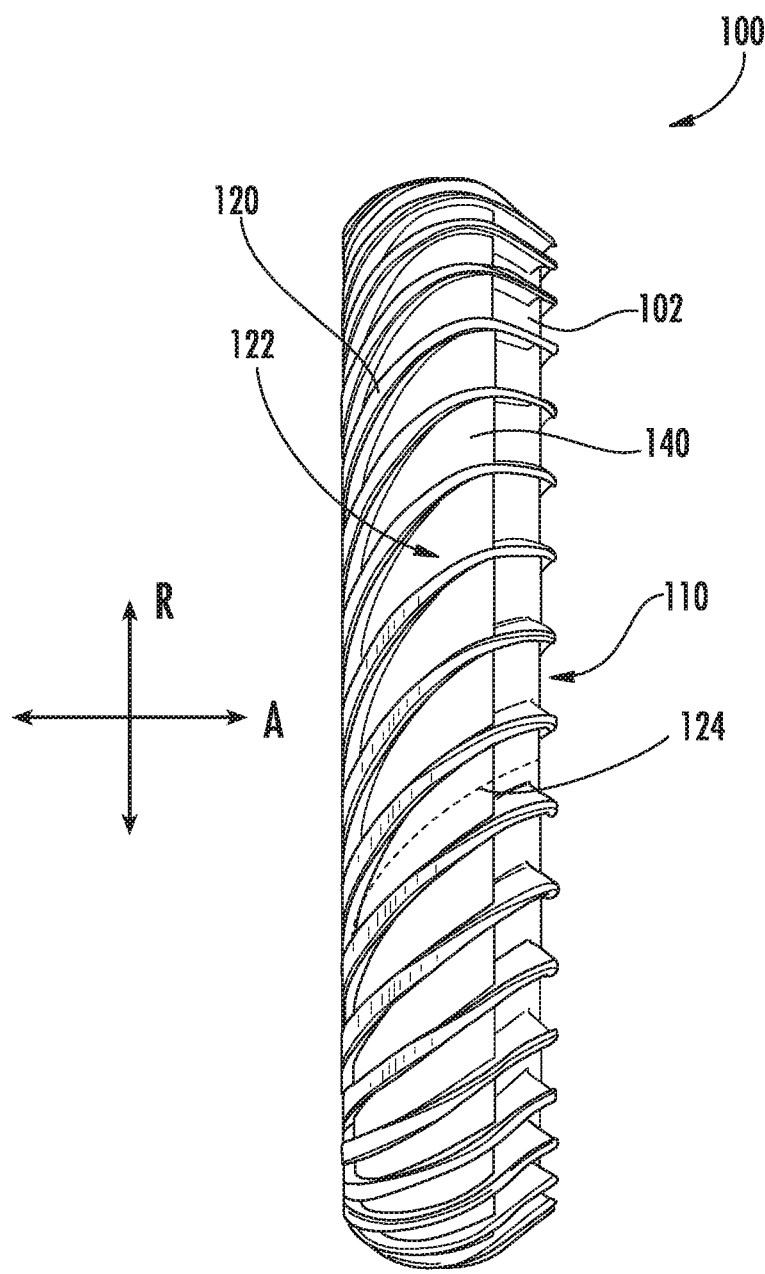
FIG. 6 provides a side view of the exemplary diffuser-deswirler of FIG. 3 with the outer shell removed.
Figure 7:
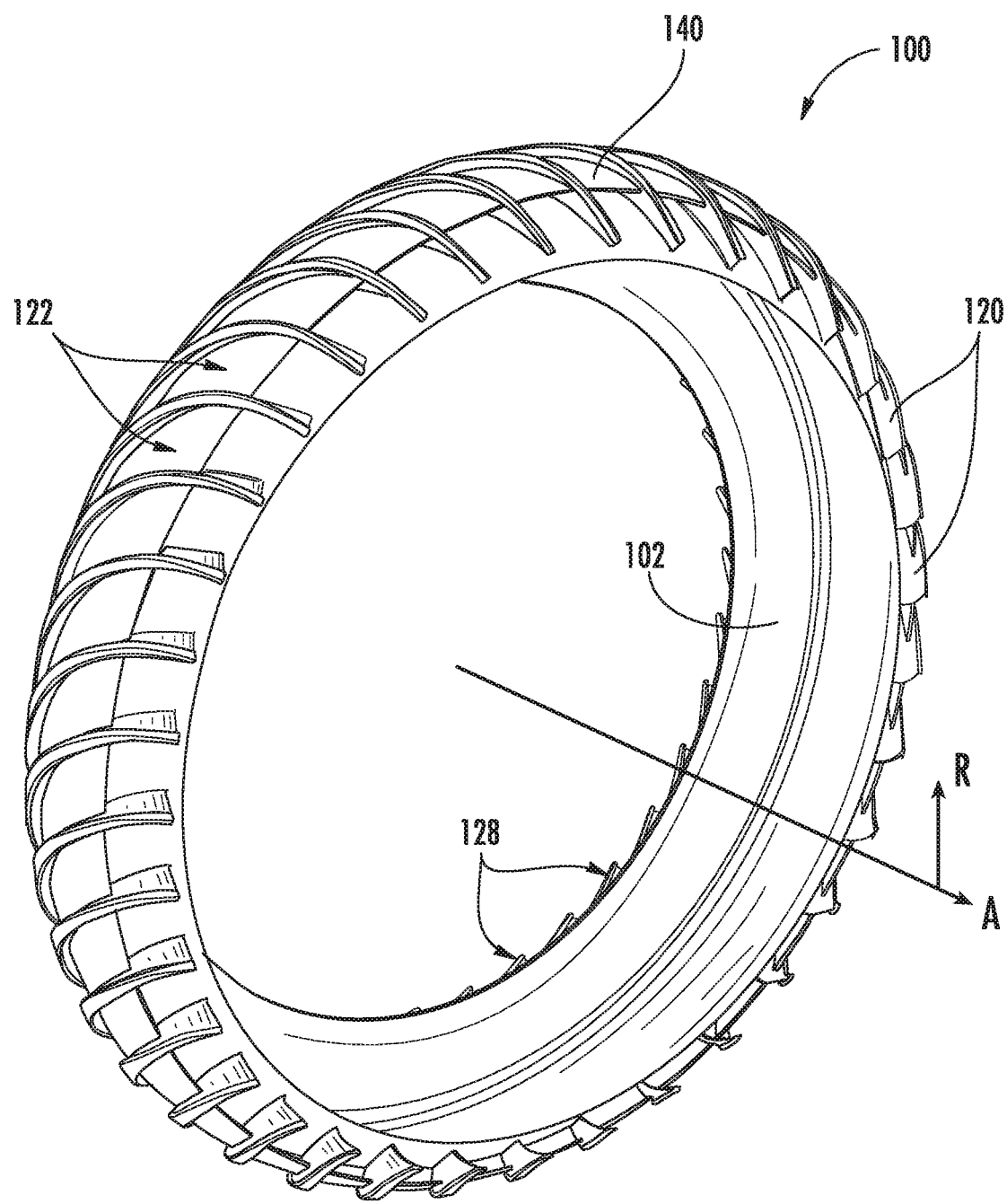
FIG. 7 provides a rear perspective view of the exemplary diffuser-deswirler of FIG. 3 with the outer shell removed to reveal the plurality of vanes and a splitter according to an exemplary embodiment of the present subject matter.

Referring now to FIG. 5, a front perspective view of diffuser-deswirler 100 is provided with outer shell 104 removed to reveal a plurality of vanes 120 according to an exemplary embodiment of the present subject matter. Vanes 120 are generally positioned within flow conditioning passageway 106 such that inner shell 102, outer shell 104, and vanes 120 define a plurality of fluid passageways 122. More specifically, vanes 120 extend between inner shell 102 and outer shell 104 to divide flow conditioning passageway 106 and split a flow of compressed air flowing through inlet 108. According to the illustrated embodiment, diffuser-deswirler 100 includes thirty-six vanes 120 defining thirty-six fluid passageways 122 spaced evenly about the circumferential direction C. However, it should be appreciated that according to alternative embodiments, any suitable number of vanes 120 may be used, e.g., more than twenty vanes 120, more than thirty vanes 120, etc.

Using the additive manufacturing methods described herein, fluid passageways 122 having any suitable size, shape, length, and configuration may be formed with minimal manufacturing restrictions. In this regard, for example, computational analysis or empirical studies may be performed to determine how to form fluid passageways 122 to achieve improved diffusion, deswirling, and fuel combustion. For example, according to one embodiment, each fluid passageway 122 may be straight, curvilinear, helical, or any other suitable shape.

Figure 8:
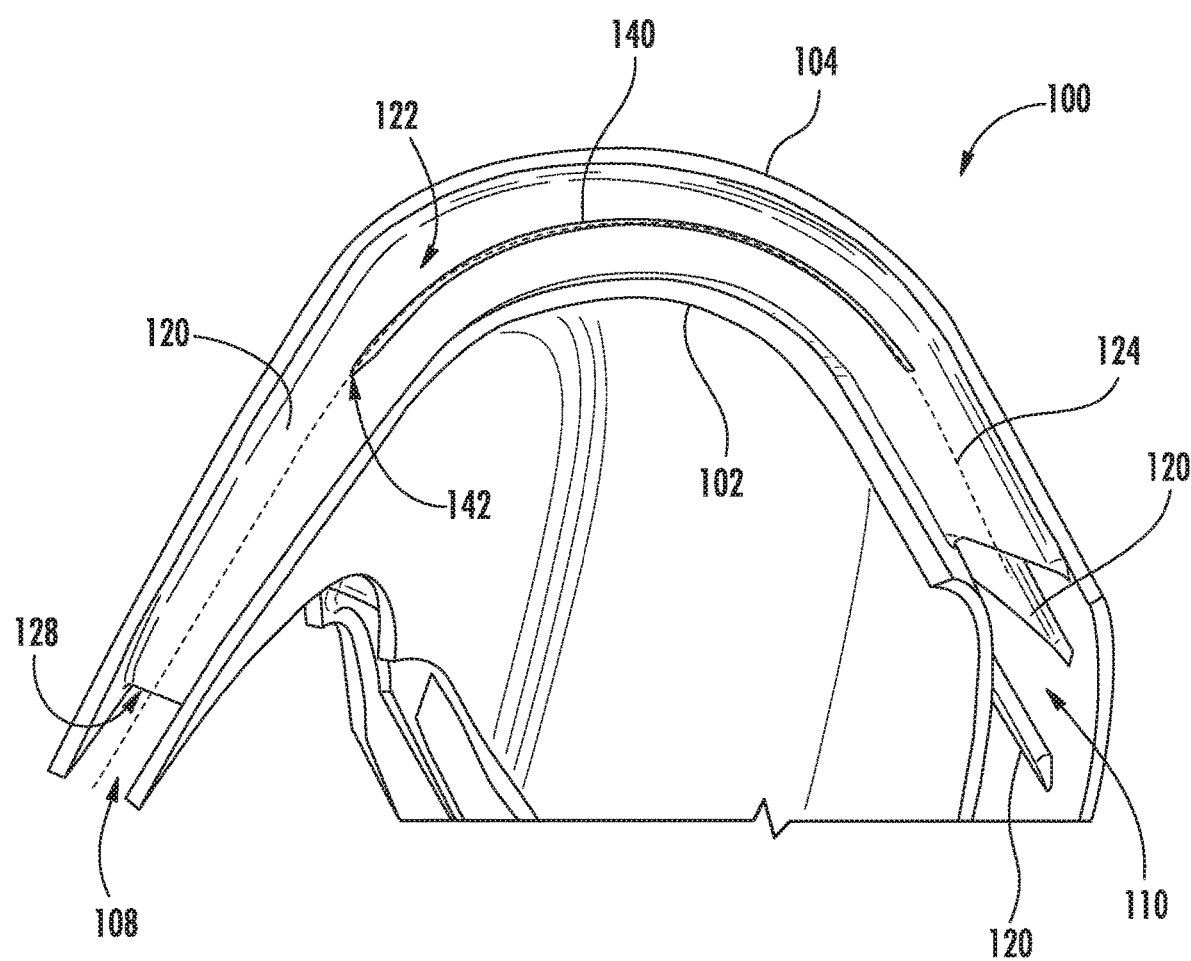
FIG. 8 provides a cross sectional view of the exemplary diffuser-deswirler of FIG. 3 taken along Line 8-8 of FIG. 4.
Figure 9:
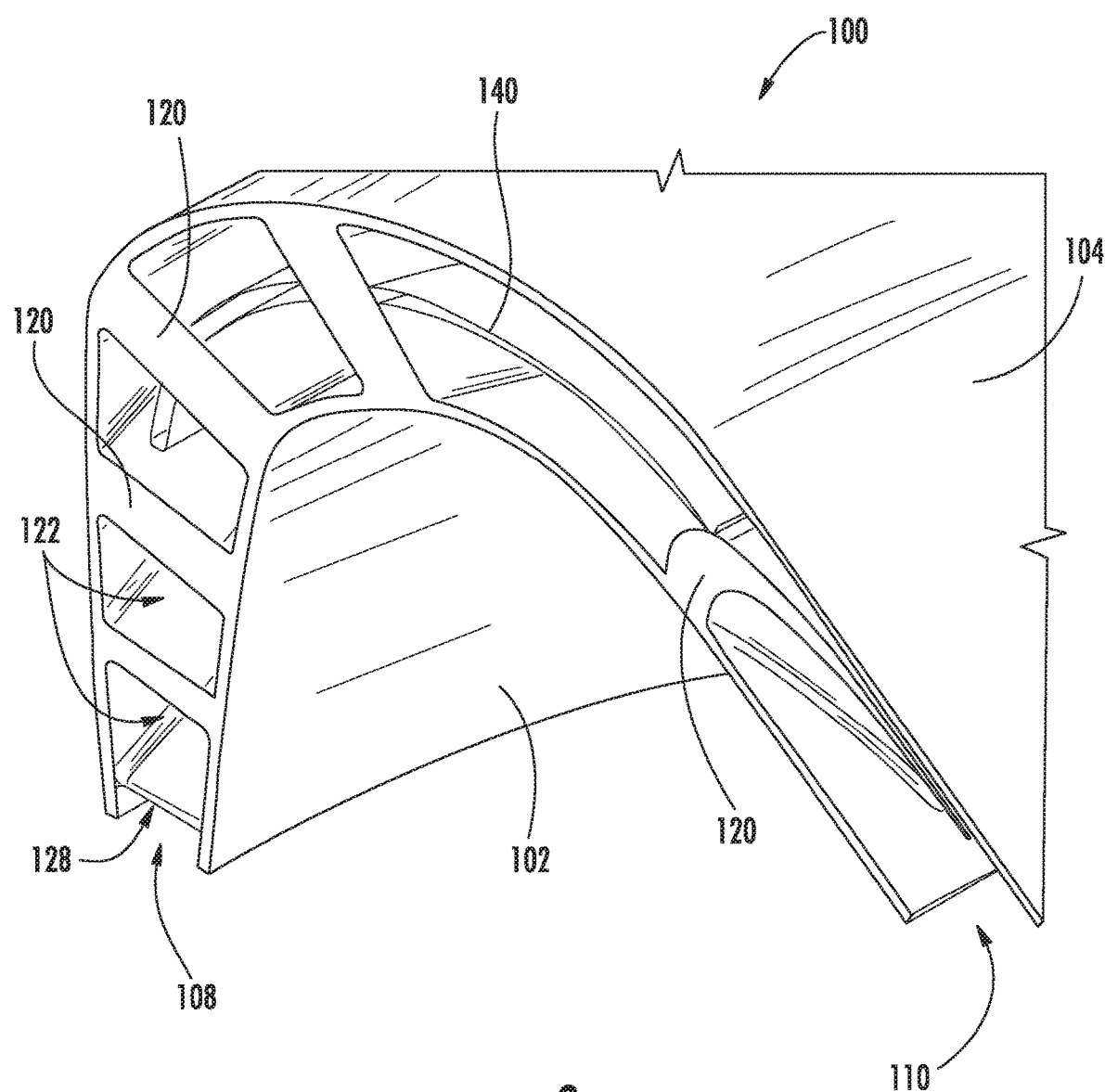
FIG. 9 provides a cross sectional view of the exemplary diffuser-deswirler of FIG. 3 taken along Line 9-9 of FIG. 4.

Each fluid passageway 122 may define a cross section having any suitable size and geometry at any location along fluid passageway 122. In this regard, each fluid passageway 122 may define a centerline 124 (see, e.g., FIG. 8) that extends from inlet 108 to outlet 110 through the midpoint of fluid passageway 122. According to one exemplary embodiment, each fluid passageway 122 can define a fixed cross-sectional area along centerline 124. According to an alternative embodiment, each fluid passageway 122 may define a cross section that varies smoothly and continuously from inlet 108 to outlet 110.

According to an exemplary embodiment, each fluid passageway 122 can have a cross sectional geometry that is substantially rectangular with rounded edges. Alternatively, the cross section may be circular, elliptical, oblong, or any other suitable geometry. In addition, the cross sectional geometry may vary along the length of centerline 124. For example, the cross section of fluid passageways 122 may be rectangular proximate inlet 108 and transition into an elliptical cross section proximate outlet 110. According to alternative embodiments, each fluid passageway 122 defines an identical cross sectional area at every cross sectional plane taken perpendicular to centerline 124. Other configurations are possible and within the scope of the present subject matter.

The additive manufacturing methods described herein enable fluid passageways 122 to be formed in any suitable shape and in any suitable directional orientation. For example, referring to FIG. 3, fluid passageways 122 define a diffuser section 125 positioned proximate inlet 108 and high pressure compressor 24. Diffuser section 125 extends substantially perpendicular to the axial direction A. In addition, fluid passageways 122 define a deswirler section 126 positioned downstream of diffuser section 125 proximate outlet 110 and combustion section 26. Deswirler section 126 extends substantially parallel to the axial direction A. Finally, fluid passageways 122 define a transition section 127 fluidly coupling the diffuser section 125 and the deswirler section 126. The transition section 127 is configured for both diffusing and deswirling a flow of compressed air. Although diffusion section 125 and deswirler section 126 are configured primarily for diffusing and deswirling, respectively, a flow of compressed air, it should be appreciated that because fluid passageways 122 may be formed in any manner with little or no manufacturing restrictions, the entire length of fluid passageways may be designed to both diffuse, deswirl, or otherwise condition air in an improved and more efficient manner. In this regard, "flow conditioning" may be used herein to refer to the manipulation or variation of any parameter of a flow of fluid, such as by diffusing, deswirling, turning, redirecting, decelerating, accelerating, etc.

According to the illustrated embodiment, fluid passageways 122 extend substantially perpendicular to the axial direction A proximate inlet 108. In this manner, for example, high pressure compressor 24 discharges compressed air through inlet 108 in a plane perpendicular to the axial direction A. More particularly the compressed air will have an exit angle from the high pressure compressor 24 that has a radial component (extending along the radial direction R) and a tangential component (extending perpendicular to the radial direction R). According to an exemplary embodiment, vanes 120 define a leading edge 128 that extends substantially between inlet 108 and outlet 110.

More specifically, referring to FIG. 3, high pressure compressor 24 may define a compressor outlet 150 positioned immediately adjacent inlet 108. A radial tip 152 of an impeller 154 of the compressor may extend along the radial direction R all the way to compressor outlet 150. In addition, diffuser-deswirler 100 may be mounted adjacent to high pressure compressor 24 such that inlet 108 and compressor outlet 150 are immediately adjacent to each other such that no compressor air may leak outside inlet 108. Moreover, leading edge 128 is positioned at the forward-most portion of inlet 108 such that radial tip 152 and leading edge 128 are immediately adjacent and almost in contact. In this manner, a flow of compressor discharge air is ejected from radial tip 152 of impeller 154 directly into inlet 108 and respective fluid passageways 122. In this regard, leading edge 128 is positioned proximate an impeller 154 of high pressure compressor 24, e.g., upstream of transition section 127. Moreover, according to exemplary embodiments, vanes 120 may extend along the exit angle proximate inlet 108 to allow for the intake of the compressed air with minimal drag and/or losses. However, vanes 120 may then slowly and continuously turn the flow of compressed air toward a direction substantially parallel to the axial direction A as the flow approaches outlet 110. It should be appreciated, that as used herein, terms of approximation, such as "approximately," "substantially," or "about," refer to being within a ten percent margin of error.

Referring again to FIG. 3, it should be appreciated that diffuser-deswirler 100 may have a much lower profile than prior designs, resulting in less material, lower costs, and less space required for positioning it within the engine. For example according to the illustrated embodiment, diffuser-deswirler 100 defines a first distance 130 measured along the radial direction R between inlet 108 and a radially outermost portion 132 of outer shell 104. In addition, diffuser-deswirler 100 defines a second distance 134 measured along the axial direction A between a forward-most portion 136 of outer shell 104 (e.g., closest to high pressure compressor 24) and outlet 110. According to the illustrated embodiment, first distance 130 is less than second distance 134.

Referring now generally to FIGS. 3 through 9, diffuser-deswirler 100 further includes a splitter 140 positioned within flow conditioning passageway 106. Splitter 140 generally extends along the circumferential direction C between adjacent vanes 120 to split a flow of compressed air passing through each fluid passageway 122. In this regard, for example, splitter 140 may be referred to as a "circumferential splitter" because it extends substantially along the circumferential direction C. However, according to alternative embodiments, splitter 140 may extend along any other suitable direction for splitting the flow in a desired manner. For example, according to alternative embodiments, each fluid passageway 122 may have a radially extending splitter, i.e., a "radial splitter," that divides that passageway into two circumferentially spaced passageways.

Other shapes, sizes, configurations, and orientations of splitter 140 may be used according to alternative embodiments. For example, splitter 140 may extend along a meridional plane of each fluid passageway 122, often along centerline 124, and act to split the flow along a vector tangential to the circumferential direction C of the respective fluid passageway 122. Splitters 140 are used to improve the rate at which the fluid flow can be turned towards a substantially axial direction A without incurring significant aerodynamic losses. In addition, they are employed to provide additional control of the rate of diffusion through diffuser-deswirler 100 through the creation of "new" passages. While irrespective to the design and placement of splitter 140, the leading edges of splitters 140 can be designed with any suitable shape to minimize aerodynamic losses associated with presenting a blunt body to the fluid flow. For example, splitter 140 defines a chamfered edge 142 that is designed to minimize drag on the flow of compressed air. However, according to alternative embodiments, chamfered edge 142 could instead be a tapered edge, a square edge, or any suitable shape.

According to the illustrated embodiment, splitter 140 extends along centerline 124 of each fluid passageway 122, e.g., at a location equidistant from inner shell 102 and outer shell 104. In addition, splitter 140 extends along greater than half of a length of centerline 124. However, according to alternative embodiments, splitter 140 may be positioned at any suitable location and may extend along any suitable path within flow conditioning passageway 106 to achieve the desired split of a flow of compressed air. In addition, although splitter 140 is illustrated as having a constant thickness or width along its length, it should be appreciated that splitter 140 may be tapered or may have any other suitable shape and thickness.

Diffuser-deswirler 100 can further include additional features for an improved flow of fluid passing therethrough. For example, intra-passage bleed ports (not shown) are openings within fluid passageways 122 which act as a pressure sink relative to the main fluid flow. While they do extract high pressure air from the core flowpath of turbofan 10, this extraction can aid in preventing flow separation along the walls of diffuser-deswirler 100 by extracting air from the boundary layer which forms along the walls, which is beneficial to static pressure recovery through the reduction of aerodynamic losses associated with boundary layer growth. This air can be used in other locations throughout turbofan 10 or by the aircraft as needed.

It should be appreciated that diffuser-deswirler 100 is described herein only for the purpose of explaining aspects of the present subject matter. For example, diffuser-deswirler 100 will be used herein to describe exemplary configurations, constructions, and methods of manufacturing diffuser-deswirler 100. It should be appreciated that the additive manufacturing techniques discussed herein may be used to manufacture other diffusers and deswirlers for use in any suitable gas turbine engine or in any other diffusion and deswirling application, and in any suitable industry. Thus, the exemplary components and methods described herein are used only to illustrate exemplary aspects of the present subject matter and are not intended to limit the scope of the present disclosure in any manner.

For example, although diffuser-deswirler 100 is described above as including inner shell 102, outer shell 104, vanes 120, and splitter 140 integrally formed to define and divide fluid passageways 122 for optimal diffusion and deswirling, alternative embodiments may include a plurality of circumferentially spaced flow conditioning pipes. Using FIG. 10 as an example, a diffuser-deswirler 160 according to an alternative embodiment of the present subject matter will be described.

Diffuser-deswirler 160 includes an annular inlet manifold 162 in fluid communication with a compressor of a gas turbine engine (e.g., high pressure compressor 26 of turbofan 10). In addition, diffuser-deswirler 160 includes an annular outlet manifold 164 in fluid communication with a combustor of the gas turbine engine (e.g., combustion section 26 of turbofan 10). Diffuser-deswirler 160 further includes a plurality of flow conditioning pipes 166, each of which define a fluid passageway 168 providing fluid communication between inlet manifold 162 and outlet manifold 164.

It should be appreciated that fluid passageways 168 may have any suitable shape for diffusing and deswirling a flow of air from high pressure compressor 24 before passing the flow into combustion section 26. For example, according to one exemplary embodiment, diffuser-deswirler 160 and fluid passageways 168 may be configured to function in a manner similar to diffuser-deswirler 100 and fluid passageways 122, respectively. According to one exemplary embodiment, flow conditioning pipes 166 defines an elliptical cross-section along a centerline (not shown) of flow conditioning pipes 166, the cross-section increasing smoothly and continuously from inlet manifold 162 to outlet manifold 164.

Figure 10:
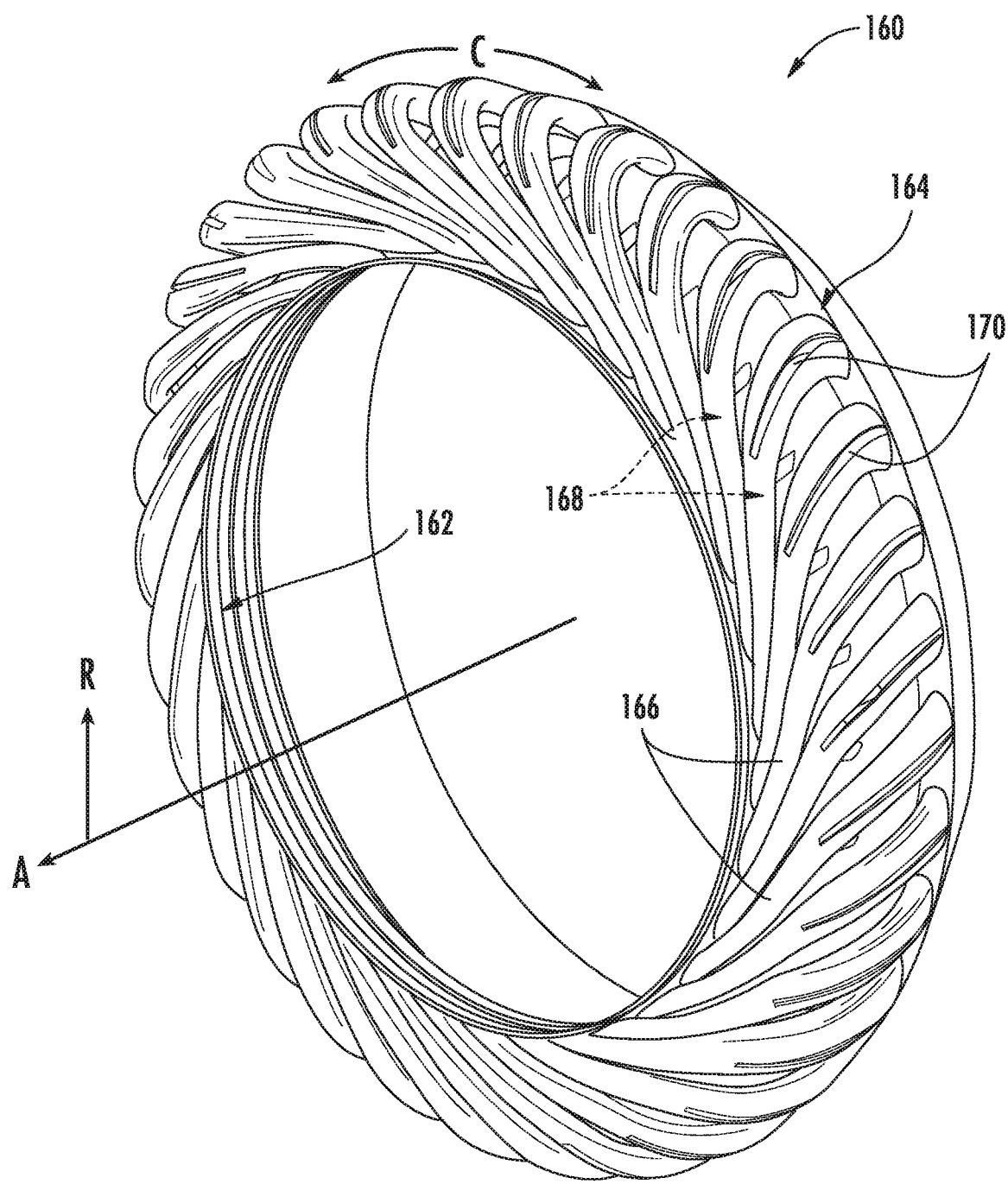
FIG. 10 provides a perspective view of an additively manufactured diffuser-deswirler including a plurality of flow conditioning pipes according to an exemplary embodiment of the present subject matter.

As illustrated in FIG. 10, diffuser-deswirler 160 further includes a splitter 170 defined by flow conditioning pipes 166. In this manner, splitter 170 generally extends along the circumferential direction C across a width of each flow conditioning pipe 166 to split a flow of compressed air passing through each fluid passageway 168. Therefore, splitter 170 may be configured similar to splitter 140 to perform the same or a similar function. For example, splitter 170 may be tapered, may have a constant cross section, may be positioned along a portion of the centerline of fluid passageway 168, or may be shaped, oriented, and positioned in any other suitable manner.

Now that the construction and configuration of diffuser-deswirlers 100, 160 according to an exemplary embodiment of the present subject matter has been presented, an exemplary method 200 for forming a diffuser-deswirler according to an exemplary embodiment of the present subject matter is provided. Method 200 can be used by a manufacturer to form diffuser-deswirler 100, or any other suitable diffusing and deswirling component. It should be appreciated that the exemplary method 200 is discussed herein only to describe exemplary aspects of the present subject matter, and is not intended to be limiting.

Figure 11:
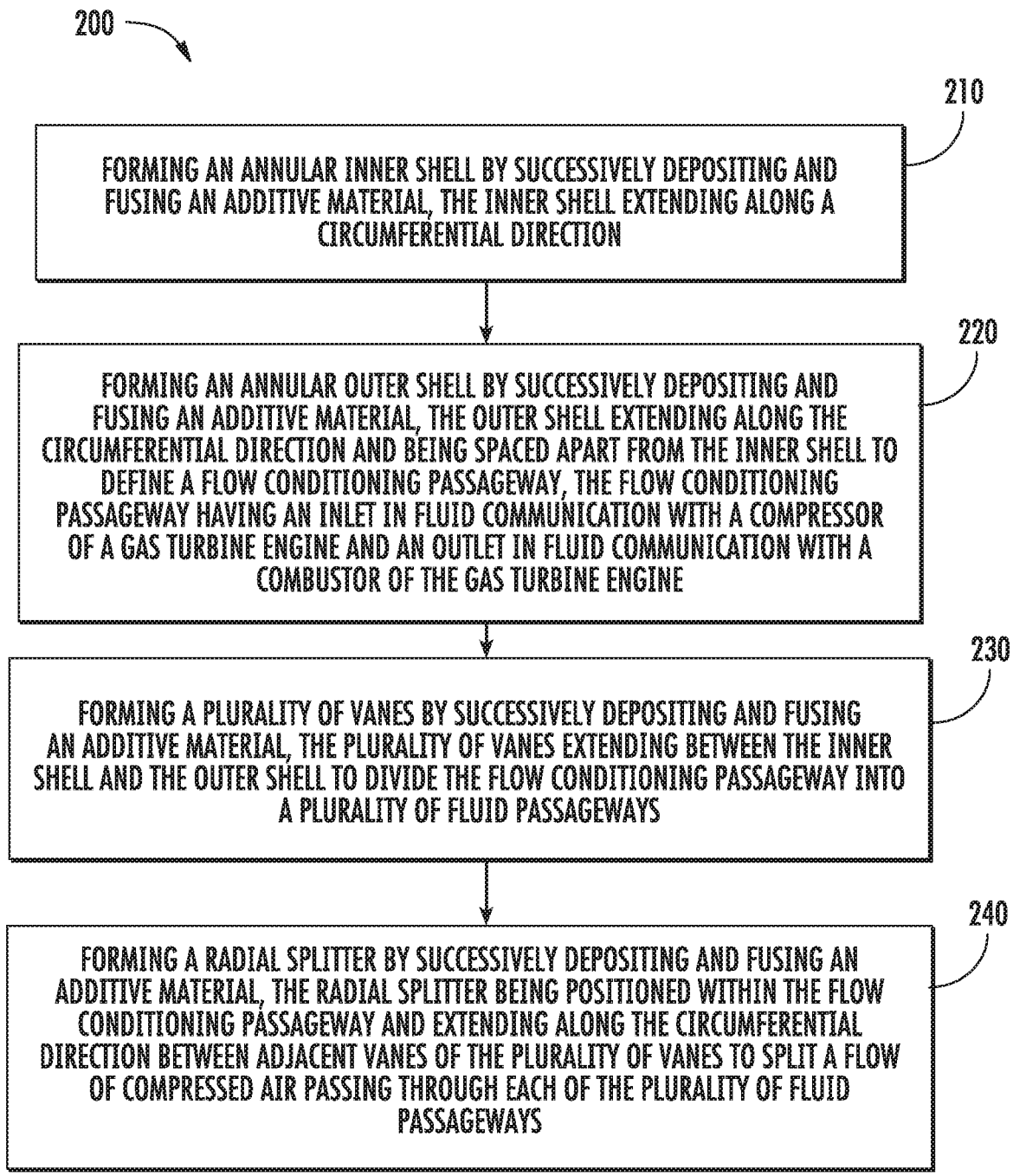
FIG. 11 is a method for forming a diffuser-deswirler according to an exemplary embodiment of the present subject matter.

Referring now to FIG. 11, method 200 includes, at step 210, forming an annular inner shell by successively depositing and fusing an additive material, the inner shell extending along a circumferential direction. Step 220 includes forming an annular outer shell by successively depositing and fusing an additive material, the outer shell extending along the circumferential direction and being spaced apart from the inner shell to define a flow conditioning passageway. The flow conditioning passageway has an inlet in fluid communication with a compressor of a gas turbine engine and an outlet in fluid communication with a combustor of the gas turbine engine.

Method 200 further includes, at step 230, forming a plurality of vanes by successively depositing and fusing an additive material, the plurality of vanes extending between the inner shell and the outer shell to divide the flow conditioning passageway into a plurality of fluid passageways. Step 240 includes forming a splitter by successively depositing and fusing an additive material, the splitter being positioned within the flow conditioning passageway and extending along the circumferential direction between adjacent vanes of the plurality of vanes to split a flow of compressed air passing through the each of the plurality of fluid passageways.

Step 210 through 240 may be performed using any of the additive manufacturing processes described herein. As explained above with respect to exemplary diffuser-deswirlers 100, 160, these methods enable the formation of the inner shell, the outer shell, the vanes, the splitter, and other features as a single monolithic piece have any suitable number, size, shape, and configuration. In this manner, improved diffusion, deswirling, and combustion may be facilitated.

FIG. 11 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using diffuser-deswirler 100 as an example, it should be appreciated that these methods may be applied to manufacture any suitable diffuser-deswirler.

An additively manufactured diffuser-deswirler and a method for manufacturing that diffuser-deswirler are described above. Notably, diffuser-deswirler 100 may generally include performance-enhancing geometries and flow regulation features whose practical implementations are facilitated by an additive manufacturing process, as described herein. For example, the diffuser-deswirler may include a plurality of fluid flow passageways that continuously diffuse and deswirl compressed air for improved combustion. In addition, the plurality of fluid flow passageways may include integrally formed splitters that reduce flow separation and improve efficiency of diffusion and deswirling. These vanes and splitters may be formed to have an aerodynamic contour to reduce drag on a flow of compressed air while improving diffusion and deswirling. Furthermore, the diffuser-deswirler may include integrally formed structural load-bearing features, such as stiffening struts, ridges, or walls. These features may be introduced during the design of the diffuser-deswirler, such that they may be easily integrated into the diffuser-deswirler during the build process at little or no additional cost. Moreover, the entire diffuser-deswirler, including the inner shell, the outer shell, the plurality of vanes, the splitter, and other features can be formed integrally as a single monolithic component.

Prior art diffuser and deswirler assemblies (such as diffuser and deswirler assembly 80 in FIG. 3) include a diffusing section proximate the inlet and a deswirling section proximate the outlet. The transition section provides fluid communication between the diffusing section and the deswirling section, but does little to further condition the flow of compressed air. By contrast, the additive manufacturing methods described herein enable an optimal shape of flow conditioning passageway 106 and fluid passageways 122 to allow the compressed air to be diffused and deswirled along an entire length of fluid passageways 122.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A diffuser-deswirler for conditioning a flow of compressed air from a compressor, the diffuser-deswirler defining an axial direction, a radial direction, and a circumferential direction, the diffuser-deswirler comprising:
an annular inner shell;
an annular outer shell spaced apart from the inner shell; and
a plurality of vanes extending between the inner shell and the outer shell, the inner shell, the outer shell, and the plurality of vanes defining a plurality of fluid passageways, at least one of the plurality of vanes defining a leading edge proximate to an impeller of the compressor, wherein the plurality of fluid passageways defines a diffuser section extending substantially perpendicular to the axial direction, a deswirler section extending substantially parallel to the axial direction, and a transition section fluidly coupling the diffuser section and the deswirler section, the transition section being configured for both diffusing and deswirling the flow of compressed air, wherein the plurality of vanes extend through each of the diffuser section, the deswirler section, and the transition section.

2. The diffuser-deswirler of claim 1, wherein the leading edge of at least one of the plurality of vanes is positioned upstream of the transition section.

3. The diffuser-deswirler of claim 1, wherein the diffuser section and the deswirler section each define nonlinear flow paths.

4. The diffuser-deswirler of claim 1, further comprising:
a splitter extending between adjacent vanes of the plurality of vanes to split the flow of compressed air passing through the plurality of fluid passageways.

5. The diffuser-deswirler of claim 4, wherein the splitter defines a leading edge that is chamfered.

6. The diffuser-deswirler of claim 4, wherein the splitter extends at least partially along a centerline of each of the plurality of fluid passageways at a location equidistant from the inner shell and the outer shell.

7. The diffuser-deswirler of claim 6, wherein the splitter extends along greater than half of the centerline of each of the plurality of fluid passageways.

8. The diffuser-deswirler of claim 1, wherein the inner shell, the outer shell, and the plurality of vanes are integrally formed as a single monolithic component.

9. The diffuser-deswirler of claim 1, wherein the diffuser-deswirler defines a first distance measured along the radial direction between an inlet and a radially outermost portion of the outer shell and a second distance measured along the axial direction between a forward-most portion of the outer shell and an outlet, the first distance being less than the second distance.

10. The diffuser-deswirler of claim 1, wherein a cross-sectional area of each of the plurality of fluid passageways increases smoothly and continuously from an inlet to an outlet.

11. The diffuser-deswirler of claim 1, wherein each of the plurality of fluid passageways defines a substantially rectangular cross-section.

12. The diffuser-deswirler of claim 1, wherein the plurality of fluid passageways comprises greater than thirty fluid passageways.

13. The diffuser-deswirler of claim 1, wherein the diffuser-deswirler is formed by:
depositing a layer of additive material on a bed of an additive manufacturing machine; and
directing energy from an energy source onto the layer of additive material to fuse a portion of the additive material.

14. A method of manufacturing a diffuser-deswirler, the method comprising:
depositing a layer of additive material on a bed of an additive manufacturing machine; and
directing energy from an energy source onto the layer of additive material to fuse a portion of the additive material and form:
an annular inner shell;
an annular outer shell spaced apart from the inner shell;
a plurality of vanes extending between the inner shell and the outer shell to define a plurality of fluid passageways, the plurality of fluid passageways defining a diffuser section extending substantially perpendicular to an axial direction, a deswirler section extending substantially parallel to the axial direction, and a transition section fluidly coupling the diffuser section and the deswirler section, the transition section being configured for both diffusing and deswirling the flow of compressed air, wherein the plurality of vanes extend through each of the diffuser section, the deswirler section, and the transition section; and
a splitter by extending between adjacent vanes of the plurality of vanes to split a flow of compressed air passing through the each of the plurality of fluid passageways.

* * * * *